United States Patent
Wang et al.

(10) Patent No.: US 12,124,555 B2
(45) Date of Patent: Oct. 22, 2024

(54) METHOD AND DEVICE FOR PROVIDING SECURE ACCESS TO AN ELECTRONIC DEVICE

(71) Applicant: LENOVO (SINGAPORE) PTE. LTD, New Tech Park (SG)

(72) Inventors: Mengnan Wang, Chapel Hill, NC (US); John W. Nicholson, Cary, NC (US); Daryl C. Cromer, Raleigh, NC (US); Howard Locker, Cary, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 257 days.

(21) Appl. No.: 17/656,784

(22) Filed: Mar. 28, 2022

(65) Prior Publication Data
US 2023/0306098 A1  Sep. 28, 2023

(51) Int. Cl.
G06F 21/36 (2013.01)

(52) U.S. Cl.
CPC .................. *G06F 21/36* (2013.01)

(58) Field of Classification Search
None
See application file for complete search history.

(56) References Cited

U.S. PATENT DOCUMENTS

| | | | | |
|---|---|---|---|---|
| 2003/0210127 A1* | 11/2003 | Anderson | ............... | G06F 21/36 340/5.27 |
| 2007/0061589 A1* | 3/2007 | Ulmer | ..................... | G06F 21/83 713/185 |
| 2007/0118876 A1* | 5/2007 | Singh | .................... | H04L 63/107 726/2 |
| 2009/0044282 A1* | 2/2009 | Govindaraju | ............ | G09C 1/00 708/250 |
| 2009/0106827 A1* | 4/2009 | Cerruti | .................... | G06F 21/83 726/7 |
| 2014/0111439 A1* | 4/2014 | Joe | ....................... | G06F 3/04883 345/168 |
| 2014/0201844 A1* | 7/2014 | Buck | ..................... | G06F 21/554 726/26 |
| 2018/0025702 A1* | 1/2018 | Aurongzeb | .......... | G09G 3/3406 345/589 |
| 2020/0082130 A1* | 3/2020 | Li | ....................... | G06F 3/04886 |

* cited by examiner

Primary Examiner — Scott B Christensen
(74) Attorney, Agent, or Firm — Dean D. Small; The Small Patent Law Group, LLC

(57) ABSTRACT

An electronic device is provided that includes a processor, and a data storage device having executable instructions accessible by the processor. Responsive to execution of the instructions, the processor obtains context data, and provides a login prompt. The processor may also vary input device input configured to enter values into the login prompt based on the context data, rearrange keys of a touchscreen keyboard on a display, the displayed input configured to enter the values into the login prompt based on the context data, or vary the location of a touchscreen keyboard based on the context data.

18 Claims, 6 Drawing Sheets

METHOD AND DEVICE FOR PROVIDING SECURE ACCESS TO AN ELECTRONIC DEVICE

BACKGROUND

Embodiments herein generally relate to methods and devices for providing secure access to an electronic device.

Electronic devices, such as laptop computers, mobile phones, personal digital assistants (PDAs), iPads, other computing devices, etc. have become part of many individuals' everyday life. Such electronic devices continue to be improved to make the experience of user as enjoyable as possible.

With the increase of popularity of electronic devices, security related to accessing these devices continues to be a concern. Often an electronic device includes a username and password that must be entered before the electronic device can be accessed. However, bad actors can often determine a login, username, password, or the like and gain access to information, files, etc. accessible to the electronic device. Such information may include social security numbers, bank account information, personal email, or messaging information, other personal or confidential information, or the like.

One of the ways the bad actors, or nefarious individuals gain access to an electronic device, files, programs, accounts, etc. is by watching a user input login information when the user is in a public environment. In particular, a nefarious individual may look over the shoulder, or around the individual as they are typing in a password. To this end, unbeknownst to the user, a nefarious individual may even record a person typing in a password and then determine from the location of the keys the password of the user.

SUMMARY

In accordance with embodiments herein, an electronic device is provided that includes a processor, and a data storage device having executable instructions accessible by the processor. Responsive to execution of the instructions, the processor obtains context data, and provides a login prompt. The processor may also vary input device input configured to enter values into the login prompt based on the context data, rearrange keys of a touchscreen keyboard on a display, the displayed input configured to enter the values into the login prompt based on the context data, or vary the location of a touchscreen keyboard based on the context data.

Optionally, the input device is a keyboard having plural keys, and each key of the keyboard provides a value entered into the login prompt. In one aspect, the value is at least one of a letter, number, or symbol. In another aspect, the input device is a keyboard having plural keys, and at least one key of the plural keys has a key indicator, and when actuated, the at least one key provides a value into the login prompt that is different than the key indicator. Optionally, the processor displays a touchscreen keyboard on a display screen that includes at least one key that has the key indicator along with the value placed in the login prompt when the at least one key of the keyboard is actuated. In one example, the displayed input is a touchscreen keyboard having plural keys, wherein each key provides a value of the values entered into the login prompt.

Optionally, the input device is a keyboard having plural keys, and at least one key of the plural keys has a key indicator. The process may also determine whether an individual other than a user is within an environment of the electronic device, and vary a value input into the login prompt from actuating the at least one key to be different than the key indicator on the at least one key in response to determining the individual other than the user is within the environment. In one aspect, the processor can also determine whether an individual other than a user is within an environment of the electronic device, display the touchscreen keyboard with a key arrangement of a traditional keyboard in response to determining the individual other than the user is not in the environment, and display the touchscreen keyboard with the key arrangement different than the traditional keyboard in response to determining the individual other than the user is in the environment. In another aspect, the system also includes a sensor configured to obtain the context data. In one example, the context data includes user characteristics and environmental characteristics.

In accordance with embodiments herein, a method is provided that includes obtaining context data, and providing a login prompt for accessing the electronic device. The method may also include varying input device input configured to enter values into the login prompt based on the context data, or rearranging a displayed input on a display, the displayed input configured to enter the values into the login prompt based on the context data, or varying the location of a touchscreen keyboard based on the context data.

Optionally, the input device is a keyboard having plural keys, and at least one key of the plural keys has a key indicator, and when actuated, the at least one key provides a value into the login prompt that is different than the key indicator. In one aspect the method also includes displaying a touchscreen keyboard on the display that includes at least one key that has the key indicator along with the value placed in the login prompt when the at least one key of the keyboard is actuated. In another aspect the method also includes determining whether an individual other than a user is within an environment of the electronic device, and varying a value input into the login prompt from actuating the at least one key to be different than the key indicator on the at least one key in response to determining the individual other than the user is within the environment. In one example, the method also includes determining whether an individual other than a user is within an environment of the electronic device, displaying the touchscreen keyboard with a key arrangement of a traditional keyboard in response to determining the individual other than the user is not in the environment, and displaying the touchscreen keyboard with the key arrangement different than the traditional keyboard in response to determining the individual other than the user is in the environment.

In accordance with embodiments herein, a computer program product is provided that includes a non-signal computer readable storage medium comprising computer executable code to automatically obtain context data, and provide a login prompt for accessing the electronic device. The code also to vary input device input configured to enter values into the login prompt based on the context data, or rearrange a displayed input on a display, the displayed input configured to enter the values into the login prompt based on the context data, or vary the location of a touchscreen keyboard based on the context data.

Optionally, the code also to automatically provide a value into the login prompt that is different than a key indicator on a key of the input device. In one aspect the code also automatically displays a touchscreen keyboard on the display that includes at least one key that has the key indicator along with the value placed in the login prompt when the at least one key of the keyboard is actuated. In another aspect, the code additionally automatically determines whether an individual other than a user is within an environment of the electronic device, and varies a value input into the login prompt from actuating the at least one key to be different than the key indicator on the at least one key in response to determining the individual other than the user is within the environment. In one example, the code also automatically determines whether an individual other than a user is within an environment of the electronic device, displays the touchscreen keyboard with a key arrangement of a traditional keyboard in response to determining the individual other than the user is not in the environment, and displays the touchscreen keyboard with the key arrangement different than the traditional keyboard in response to determining the individual other than the user is in the environment.

DETAILED DESCRIPTION

Figure 1:
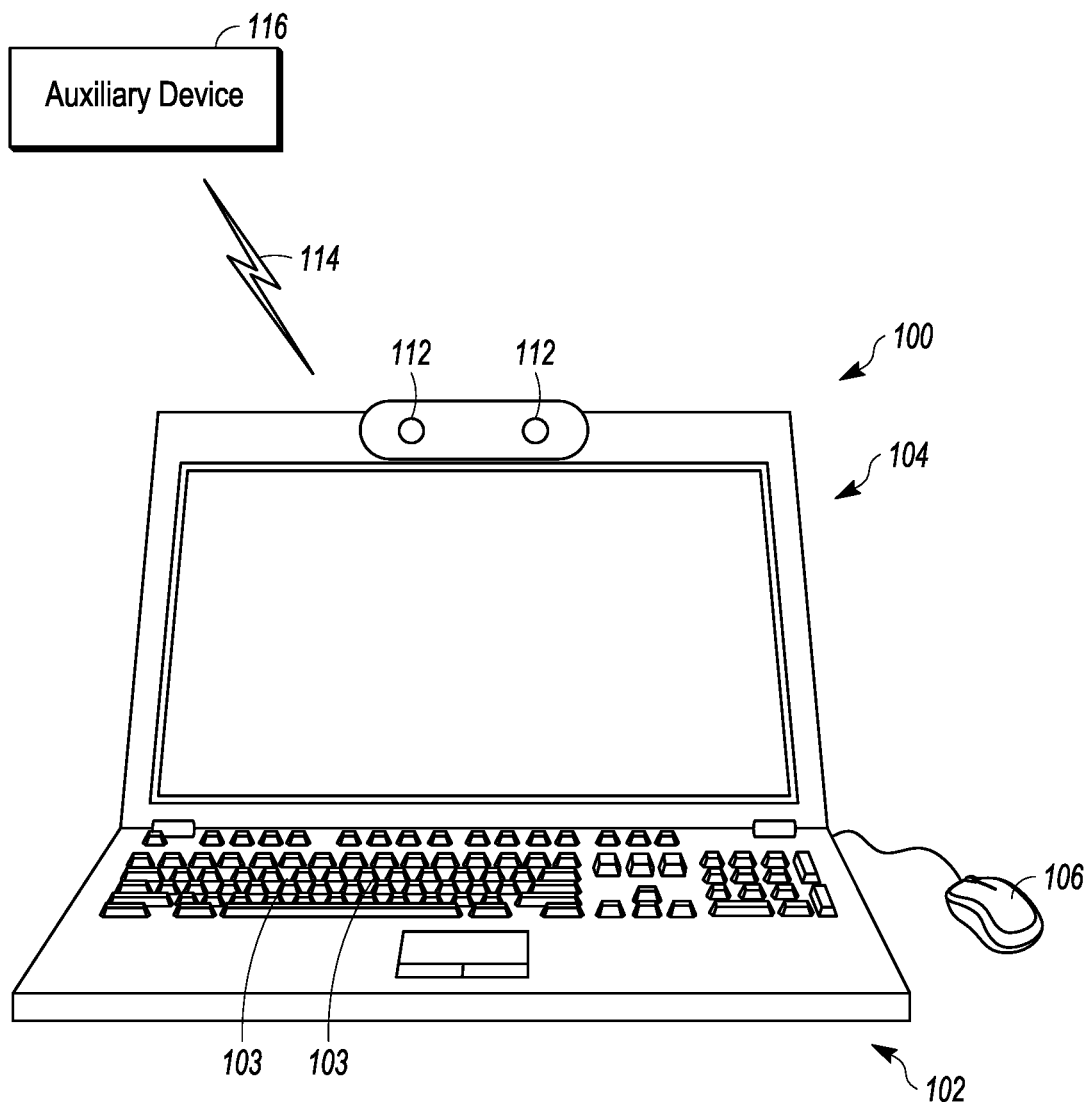
FIG. 1 illustrates an front view of an electronic device in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "environment" refers to a physical region in which one or more electronic devices are located and in which an image on a screen of the electronic device is perceived (e.g., seen) by individuals. By way of example, an environment may refer to one or more rooms within a home, office or other structure. An environment may or may not have physical boundaries. For example, an environment instead be defined based upon a range over which individuals may perceive images provided by an electronic device. When an electronic device is portable and/or handheld, an environment associated with the electronic device may shift over time when the electronic device is moved. For example, an environment surrounding a smart phone, tablet device or laptop computer moves with the smartphone, tablet device or laptop computer. An environment surrounding an electronic device will shift each time the electronic device is relocated, such as when moved between different rooms of a home, office building or other residential or commercial structure.

The term "access" as used herein refers being granted permission, being allowed to enter, being able to receive, etc. to an electronic device, program, application, webpage, website, or the like. For the avoidance of doubt, turning on or actuating an electronic device (e.g. application, program, etc.) is not accessing the electronic device. Instead, to access the electronic device a step must be undertaken for permission, allowance, or the like. The step must be taken before programs, applications, documents, files, etc. can be observed by a user.

The term "context data" shall mean any and all data, information, digital information, images, sounds, noises, etc. obtained from an environment. The context data can be obtained from sensors of an electronic device, sensors of an auxiliary electronic device that is communicated to an electronic device, a storage device of an electronic device or auxiliary electronic device, a determination made from information communicated from an auxiliary electronic device to an electronic device, a determination made from data detected by an electronic device or auxiliary electronic device, data detected by an electronic device or auxiliary electronic device, or the like. The context data can include the number of individuals in an environment, motion data, information and data related to events such as sporting events, concerts, plays, or the like, being observed by an individual, etc., noise level, location data or information, or the like.

The phrase "traditional keyboard" refers to a keyboard that includes keys arranged as provided on a qwerty keyboard of an electronic device. The traditional keyboard includes a row with the keys "1, 2, 3, 4, 5, 6, 7, 8, 9, 0". The traditional keyboard also includes a row of keys "q, w, e, r, t, y, u, i, o, p". The traditional keyboard also includes a row of keys "a, s, d, f, g, h, j, k, l, ;". The traditional keyboard also includes a row of keys "z, x, c, v, b, n, m".

The phrase "login prompt" as used herein refers to any and all areas, boxes, sections, etc. that include a place to input values such as numbers, letters, punctuation, or the like to gain access to a device, file, document, application, program, webpage, website, etc. The areas, boxes, sections, etc. can include a place for inputting a user name, a place for inputting a password, or the like. Once an accurate password, passcode, login, or the like is placed in the login prompt, accessing occurs.

The phrase "touchscreen keyboard" refers to a keyboard, series of numbers and letters, etc. that are on a display screen. When a key of the touchscreen keyboard is touched, pressed, compressed, actuated, the input of that key is entered on the display. In example embodiments the touchscreen keyboard can include pin inputs, numeric keypads, key maps, picture inputs, or the like used to access an electronic device, application, program, website, webpage, etc.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the primary electronic device and a secondary electronic device, and/or iii) receiving the data, signals, information, etc. at a remote server over a network connection. The obtaining operation, when from the perspective of a primary electronic device, may include sensing new signals in real time, and/or accessing memory to read stored data, signals, information, etc. from memory within the primary electronic device. The obtaining operation, when from the perspective of a secondary electronic device, includes receiving the data, signals, information, etc. at a transceiver of the secondary electronic device where the data, signals, information, etc. are transmitted from a primary electronic device and/or a remote server. The obtaining operation may be from the perspective of a remote server, such as when receiving the data, signals, information, etc. at a network interface from a local external device and/or directly from a primary electronic device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided for securely accessing an electronic device, file, document, application, program, website, webpage, or the like using a login prompt. A security application is provided that obtains context data related to the environment of the electronic device in response to a login prompt being provided. If the security application determines an individual other than the user is in the environment, the security application obscures the individual from being able to determine any input device input being input into the electronic device. To accomplish, the security application can vary the input of an input device (e.g. keyboard) such that if a key is actuated a different value is input into the login prompt (e.g. when the "p" key of the key board is actuated, an "s" is input into the login prompt). Alternatively, if a touchscreen keyboard is provided on the display, the keys of the touchscreen keyboard are rearranged so they are not arranged as a traditional keyboard. In addition, the touchscreen keyboard can be moved to locations on the screen that make viewing the keys actuated by a user more difficult to view by individuals in the environment.

FIG. 1 illustrates an example electronic device 100. While illustrated as a laptop, in other example embodiments the electronic device may be a smart phone, tablet, desktop, portable electronic device, or the like. The electronic device includes a an input device 102 that in this example is a keyboard that is hingedly coupled to a display 104.

The input device 102 can be a keyboard as illustrated that can include includes plural keys 103 that each have a key indicator such as "q", "w", "e", "7", "?", etc. to provide input device input into the electronic device 100. In example embodiments, a single individual key 103 may include plural key indicators such as "?" and "/" or "8" and "*", etc. depending upon if a shift key is utilized. The electronic device 100 is configured to vary inputs of the input device input into the electronic device 100. As used herein, to vary inputs means that an individual key 103 such as "a", "s", "d", "1", "f5", etc. when actuated, compressed, etc. enters a different value into the display 104 of the electronic device. So, in one example, when pressing the "a" key, the input device input is a value of "k" that is entered on a display 104.

The electronic device 100 can include a security application that determines when other individuals are within an environment, and upon determining other individuals are in an environment, the security application varies inputs of the individual keys 103. In this manner, if an individual attempts to view the keystrokes being entered by a user when logging onto the computer, the values entered into a login box, password, etc. differs from the keys pressed by the user. As an example, if an individual's password is "123456", the keys 103 may be varied such that the "y" is "1", the "m" is "2", "g" is "3", "/" is "4", "9" is "5", and "c" is "6". Thus, the user types in ymg/9c, and the input device input 123456 is entered into the password box. So, a nefarious individual in an environment attempting to steal a user's password will see the user type "ymg/9c" believing that is the password, such that if the nefarious individual steals the electronic device and types in "ymg/9c" they are unable to access the electronic device. In one example, the security application displays the value of each key on the display 104 so that the user knows how the keys are varied. While a nefarious individual may be able to see the varied keyboard on the display 104, tracking the varied information, while attempting to see the keystrokes of the user simultaneously increases the difficulty in determining the password.

In one example, the security application can randomize the varied keys such that every time a user attempts to login, the values of the input keys 103 vary. Thus, at a first time the "a" results in the value of "q" being entered on a display, whereas at a second time the "a" results in the value of "3" being entered into the display. In this manner, when the value of each key is displayed, the value displayed changes from the first time to the second time.

Alternatively, in one embodiment the input device 104 may be a touchscreen keyboard that is displayed on a touch screen of a display 102. In such an embodiment, the touchscreen keyboard is presented on the display 102 with the keys arranged in a random manner. By being presented in a random manner, if a nefarious individual attempts to determine a password, login, etc. of a user, by not understanding the location of the individual keys on the display, making such a determination is made more difficult, enhancing security. To this end, each time a login, password, etc. is required to access the electronic device, program, application, webpage, website, etc. the keys on the display 102 may be arranged in a different location.

The electronic device 100 may also include an auxiliary input device 106 such as a touch pad, a mouse that is coupled either through a cord, such as a USB cord, or wirelessly, or the like. The auxiliary input device 106 may be provided for inputting data and information into the electronic device. For example, when attempting to gain access to the electronic device, if a user has security concerns, the auxiliary input device 106 may be utilized to input a desire to scramble, rearrange, vary, etc. the input of the keys 103 of a keyboard, or keys on a touch display screen of a display 102.

The electronic device 100 can also include one or more sensors 112 and a communication link 114 to an auxiliary electronic device 116. The electronic device sensor(s) 112 and auxiliary electronic device 116 may each be configured to obtain context data, where the auxiliary electronic device 112 may communicate the context data to the electronic device via a transceiver. The context data can then be utilized by a security application to determine if individuals other than the user are in the environment, resulting in the varying of the inputs of keys 103 of a keyboard, or on a display 102.

The one or more sensors 112 may include a camera, microphone, audio device, haptic device, or the like, while the auxiliary electronic device 116 may be a Fitbit, heart monitor, wearable electronic device, smart watch, or the like. The one or more electronic device sensors 112 and auxiliary electronic device 116 may each be configured to obtain context data that can include visual data, audio data, movement data, vibration data, or the like, associated with the environment of the electronic device. To this end, the context data can be utilized to determine that other individuals may be present in the environment.

The context data can include visual data from a camera showing other individuals in an environment, or movements of other individuals in an environment. The context data may also include visual data, location data, a combination of visual data and location data, etc. that may be utilized to determine an electronic device is in a location where other individuals are likely located. Such locations may include schools, office buildings, shopping malls, stores, gyms, classrooms, public parks, libraries, coffee shops, bars, or the like. In other examples, the context data may include sound data and information, including sound received from a microphone. The sound data and information may include background noise, volume levels, voice recognition, or the like. Again, such context data can be utilized to determine whether other individuals are within an environment.

In another example, context data may also include data and information input into the electronic device. For example, a security application of the electronic device may include a physical or touch screen input or prompt requesting to know if other individuals are in the environment, if secure access is desired, or the like. In this manner, a user may input into the device that additional security is desired as a result of other individuals being in an environment.

In yet another example, context data can include information and data stored in a memory, application, etc. To this end, a security application can obtain context data such as calendar information, email or text information or the like, that identifies a location of a user during a determined period of time. In addition, context data may also be received from the auxiliary electronic device, a remote device, a third party device, or the like, where the auxiliary electronic device obtains the context data, or data or information that can be used to determine context data, and communicates the information or data to the electronic device. Context data may also be obtained by haptic sensors, other sensors, etc. that provide data or information that may be utilized to determine if individuals are in an environment other than the user.

The context data obtained using an electronic device sensor 112 or auxiliary electronic device 116 may be utilized to determine a method of accessing data and information using a login prompt. For example, when an individual is in a busy environment, a security application of the electronic device may vary inputs of keys of a keyboard, or of keys on a touchscreen keyboard on a display to prevent individuals in the environment from determining a typed in password, key, etc.

Figure 2:
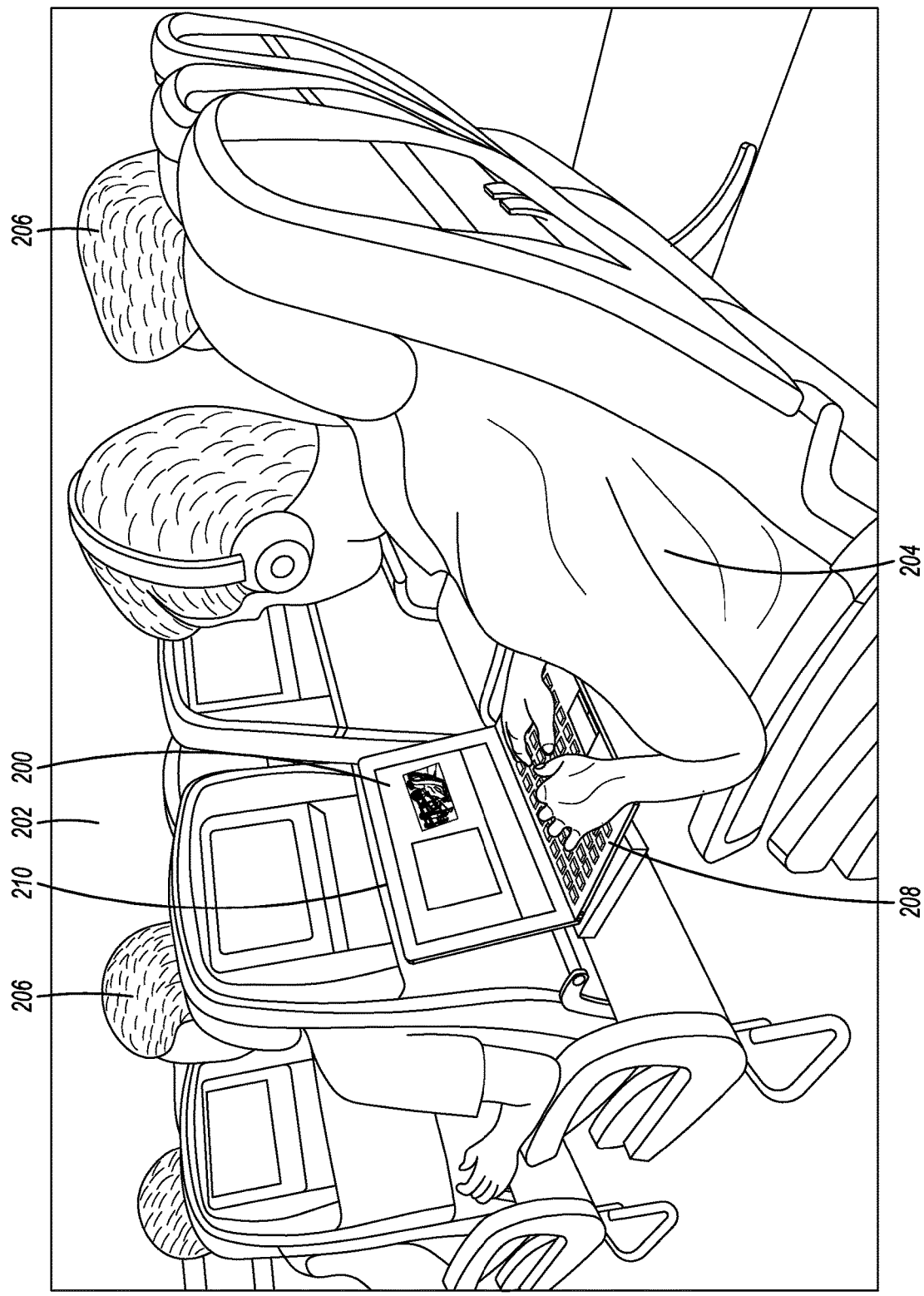
FIG. 2 illustrates a back perspective view of an electronic device in an environment in accordance with embodiments herein.

FIG. 2 illustrates an electronic device 200 in an environment 202 where additional security may be desired. In the example, a user 204 is in an airplane where several other individuals 206 are seated around the user 204 and can see inputs the user 204 is providing via an input device 208. In the example, the input device 208 is a keyboard that may be utilized to provide input device input into the electronic device as described in relation to FIG. 1. The electronic device 200 may include one or more sensors 210 utilized to capture context data for making determinations related to the environment 202 and the need for additional security.

In addition to the sensors 210, context data may be obtained by a security application by other means as well. In this example, the security application may detect that the electronic device has been placed in airplane mode, indicating the electronic device 200 is in an airplane. Thus, the security application may automatically cause varying of inputs upon detecting the electronic device 200 is in airplane mode.

While in the example of FIG. 2 the environment 202 is an airplane, in other embodiments the environment may be a store, mall, coffee shop, or the like. In each instance, the user 204 of the electronic device 200 may access an open, or public Wi-Fi network of the store, mall, coffee shop, etc. Consequently, the accessing of the public Wi-Fi network can be context data that results in the security application determining varying the inputs such as keys of a keyboard on a display is required. In this manner, in addition to context data obtained by a sensor 210 of the electronic device, context data related to operating modes, communication networks accessed, or the like may also be obtained by a security application of the electronic device 200.

Figure 3:
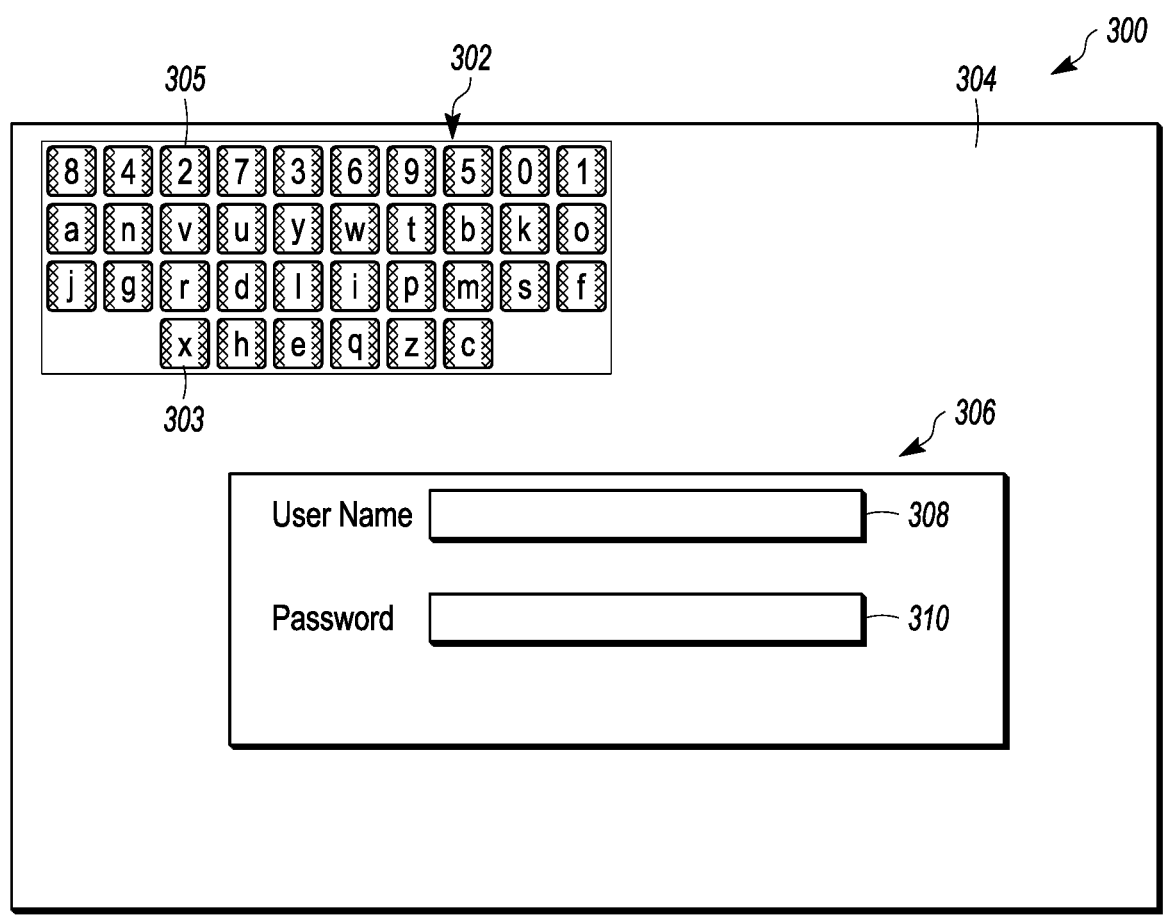
FIG. 3 illustrates a front view of an electronic device in accordance with embodiments herein.

FIG. 3 illustrates an electronic device 300 that includes an input device that includes varied keys 302. The varied keys 302 presented in the example are not presented as a typical keyboard. By having the varied keys 302 in different locations compared to a typical keyboard, understanding the individual keys actuated to provide the password by another individual in the environment becomes more difficult. For example, the varied keys 302 can include key indicators 305 on individual keys 303 that are presented on a display 304 of the electronic device 300. The key indicators 305 provide what each key 303 when actuated, provides as a value into the electronic device. In one example, when the electronic device 300 has a keyboard, the touchscreen keyboard may indicate to a user what value will be input by the input device (e.g. input device input) into the electronic device when a key 303 of the keyboard is actuated.

In this example, the input device has the varied keys 302 that are on a touchscreen keyboard that has the individual keys of the touchscreen keyboard rearranged compared to a typical keyboard, and a login prompt 306 is also presented. The login prompt 306 can include a username location 308 and a password location 310. In one example, the login prompt is a login screen provided to access the electronic device 300 when the electronic device is initially activated. In another example, the login prompt 306 is provided by an application, program, etc. of the electronic device 300. Examples of applications, programs, website, etc. include electronic mail applications, credit card applications, bill applications, or the like. To this end, the login prompt 306 may be presented by the electronic device 300, a program on the electronic device, by a webpage or website, or the like.

In another embodiment, the varied keys may include both a corresponding key of a keyboard and a varied input on the same key. Thus, the key on a touchscreen keyboard can have an "a" in the center and a "t" to the side to indicates that pushing or actuating the "a" key on the keyboard will result in a "t" being input into a location in the login prompt 306. By providing this information on the display, a user can determine how to enter their password while a nefarious individual would have to memorize every combination while also watching the user actuate each key. This would be exceptionally difficult, resulting in enhanced security for accessing the electronic device 300.

Figure 4:
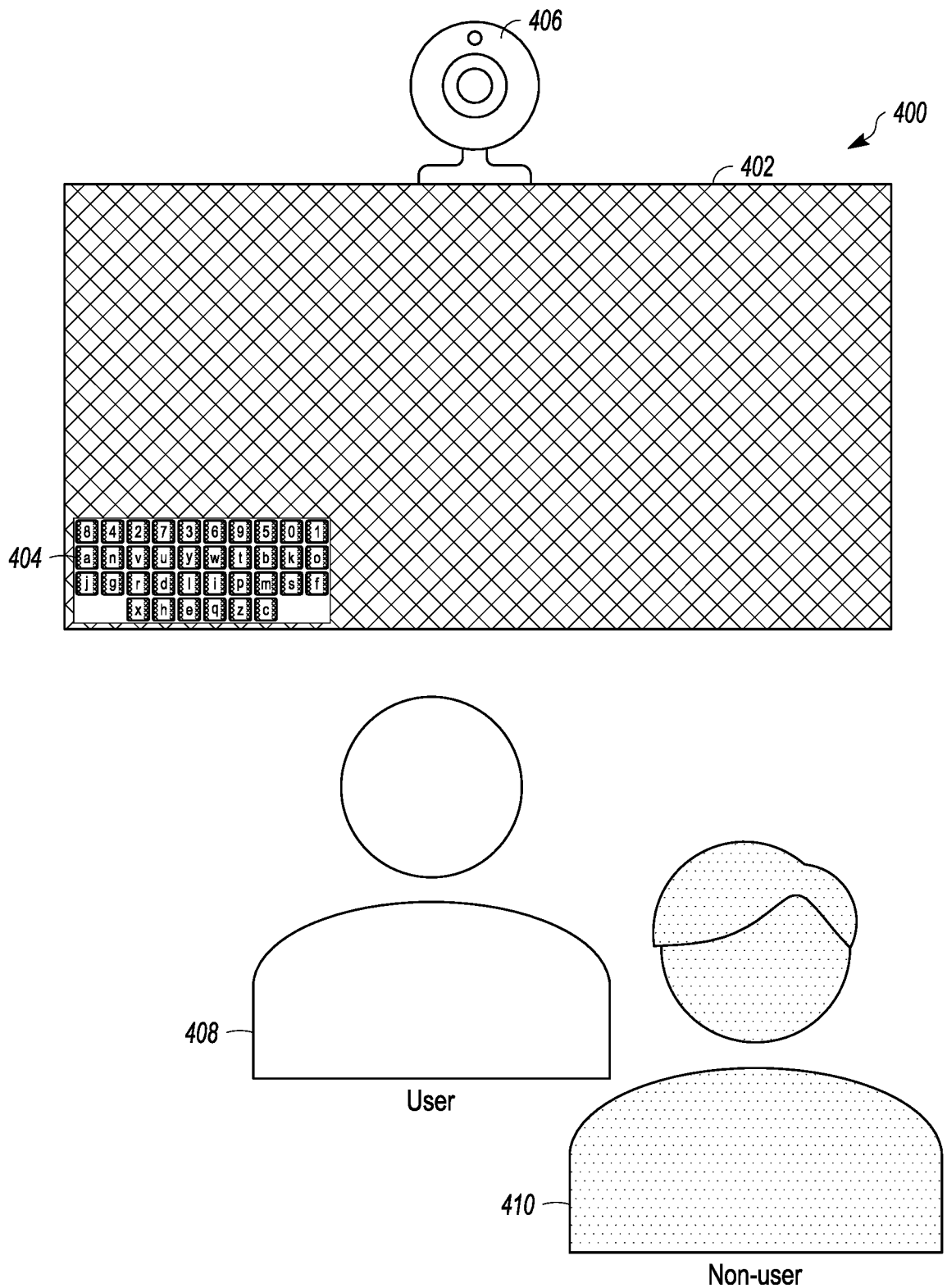
FIG. 4 illustrates a schematic front view of an electronic device in accordance with embodiments herein.

FIG. 4 illustrates another embodiment of an electronic device 400 that includes a display 402 with an input that is a touchscreen keyboard 404. The touchscreen keyboard 404 can include key indicators to provide the value of each individual key that is inputted into the electronic device 400 when the key is actuated to provide input device input. The electronic device also includes a sensor 406 that obtain context data related to the environment of a user 408. In the example of FIG. 4, the sensor 406 is a camera, but in other examples the sensor may be a microphone, infrared camera, motion detector, or the like. The context data can be related to user characteristics, environmental characteristics, etc.

In the example of FIG. 4, the context data as illustrated results in the determination that another individual 410 is over the right shoulder of the user 408. Upon determination of the existence of the other individual 410 at the location, the security application makes a determination to place the touchscreen keyboard 404 in the lower left portion of the display 402, in addition or instead of scrambling or rearranging the keys. By placing the touchscreen keyboard 404 in the lower left portion of the display 402, the user 408 is placed between the individual 410 and the touchscreen keyboard to prevent the individual from seeing the keys being actuated by the user 408 when attempting to enter a password into the electronic device 400. To this end, if the other individual 410 were to be determined to be over the left shoulder of the user 408, the security application would display the touchscreen keyboard 404 in the lower right corner of the display 402, again to place the user 408 between the individual and the touchscreen keyboard. Therefore, based on the context data, the security application may move or vary the location of the touchscreen keyboard 404 to increase security when an individual is providing information into a login prompt.

Figure 5:
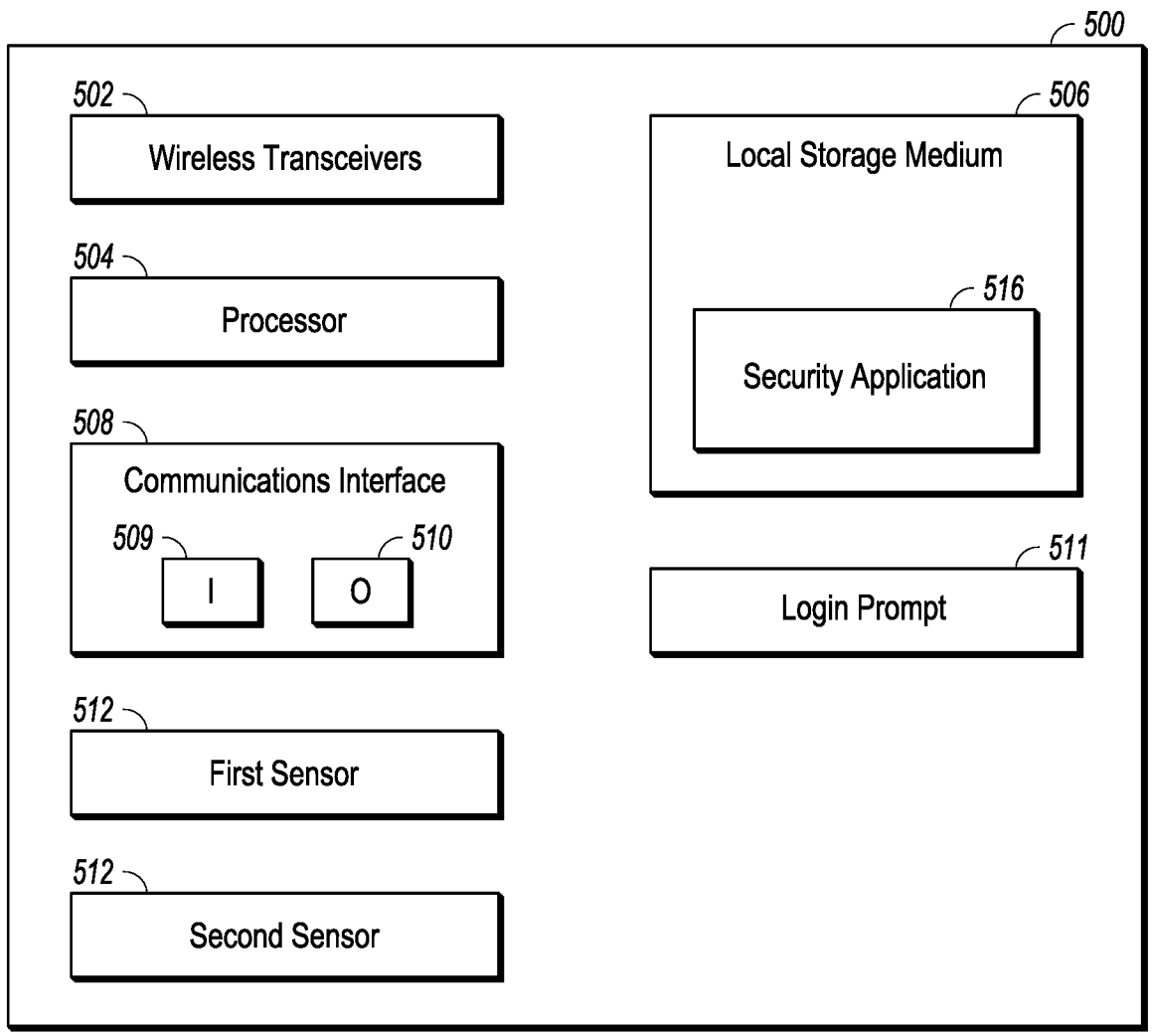
FIG. 5 illustrates a schematic view of an electronic device in accordance with embodiments herein.

FIG. 5 illustrates a simplified block diagram of an electronic device 500 configured to provide security for accessing data and information on the electronic device by using varying inputs, such as keys of an electronic device prior to entering password or other access information into the electronic device. In one example, the electronic device 400 is the electronic device of FIGS. 1-4. The electronic device 500 includes components such as one or more transceivers 502, one or more processors 504 (e.g., a microprocessor, microcomputer, application-specific integrated circuit, etc.), and one or more local storage medium (also referred to as a memory portion) 506.

Each transceiver 502 can utilize a known wireless technology for communication. The one or more processors 504 obtain context data from the electronic device, or auxiliary electronic devices, and determine whether to vary inputs such as keys while a user is logging into the electronic device to access information, data, files, programs, applications, etc. of the electronic device 500.

The local storage medium 506 can encompass one or more memory devices of any of a variety of forms (e.g., read only memory, random access memory, static random access memory, dynamic random access memory, etc.) and can be used by the one or more processors 504 to store and retrieve data. The data that is stored by the local storage medium 506 can include, but need not be limited to, context data, settings data, application data, operating systems, applications, obtained data, informational data, user characteristics data, environmental characteristics data, etc. Each application and operating system includes executable code that controls basic functions of the device, such as interaction among the various components, communication with external devices via the transceivers 502, and storage and retrieval of applications, context data, etc. to and from the local storage medium 506.

The electronic device 500 in one embodiment also includes a communications interface 508 that is configured to communicate with a network resource. The communications interface 508 can include one or more input devices 509 and one or more output devices 510. The input and output devices 509, 510 may each include a variety of visual, audio, and/or mechanical devices. For example, the input devices 509 can include a visual input device such as an optical sensor or camera, an audio input device such as a microphone, and a mechanical input device such as a keyboard, keypad, selection hard and/or soft buttons, switch, touchpad, touch screen, touch screen keyboard, icons on a touch screen, a touch sensitive areas on a touch sensitive screen and/or any combination thereof. The screen may be touch sensitive to various types of touch and gestures. In one example, the input device 509 may be a touch screen that can present a touchscreen keyboard where when an individual key on the touch screen keyboard is pressed, or touched, an input having the value of the key is inputted into the electronic device.

The input device 509 can also include a login prompt 511 for accessing the electronic device, program, webpage, etc., where actuating a key of a keyboard, or touch screen keyboard results in the letter, number, symbol, etc. of the key being input into the login prompt 511. In one example a touch screen keyboard is presented on the output device 510 with then individuals keys presented in random locations compared to a typical keyboard. As a result of the rearrangement of the keys on the touch screen keyboard, nefarious individuals in an environment have a more difficult time determining which keys of the input device 509 are being actuated to populate the login prompt 511.

As further examples, the output device(s) 510 may include a non-touch sensitive screen, a text-only screen, a smart phone screen, an audio output (e.g., a speaker or headphone jack), and/or any combination thereof.

The electronic device 500 may also include one or more electronic device sensors 512 that can obtain context data that can include user characteristics and environmental characteristics. The one or more electronic device sensors may include a microphone, camera, thermometer, heart monitor, infrared, haptic sensor, or the like that may obtain context data related to one of or both the user and/or the environment of the electronic device 500.

The electronic device 500 may also include a security application 516. In one example, the security application 516 includes instructions to access information and data of the electronic device. The security application 516 may provide methods or processes for providing access to information and data of the electronic device. In one embodiment, the security application may vary the input of keys of an input device 509 in a way that the different keys of a keyboard present different values into a login prompt 511 than indicated on the keyboard. The output device may include a legend, or manner of determining the value of each key on the keyboard to facilitate the understanding of the user of the values being input into the login prompt 511.

In another embodiment, the security application displays touch keys on the display screen that are presented in a random order and is not presented as arranged on a typical keyboard. In one example, the security application 516 includes spaces, slots, etc. for each key and a random number/letter generator is provided to randomly fill each slot, space, etc. with a letter, number, punctuation, etc. of a keyboard until all letters, numbers, and punctuations are placed. In this manner, each time an individual goes to login to their electronic device, a website, etc., the touch keys of the input device 509 provide a new randomly generated order of the keys so that during a first login process the touch screen keys are arranged in a first order, and during a second login process the touch screen keys are arranged in a second order. Alternatively the touch screen keys are rearranged, but not randomly. For example, each key may be moved one position to the right with the rightmost keys becoming the leftmost keys every time the login prompt box 511 is presented. Still, because the keys are rearranged, determining what the user inputs into the login prompt box 511 becomes more difficult, increasing security.

In addition, the security application 516 also includes instructions for determining when to rearrange the keys, or vary inputs of key of the input device for gaining access to the electronic device 500. The instructions include obtaining context data such as user characteristic data or environmental characteristic data that can be utilized to make determinations whether an environment has other individuals other than the user. To this end, when an individual desires to gain access to an electronic device, the security application 516 may include instructions to obtain sensor context data, auxiliary device context data etc. from a determined period of time, such as the previous ten minutes before an attempt is made to gain access to the electronic device 500. From this context data determinations may be made that a user is in an environment where potentially nefarious individuals are located.

For example, the amount of average noise recorded during the determined period of time may be above a determined threshold noise level, indicating the user is in a noisy environment that can include other individuals. In another example, a location, Wi-Fi connection, electronic device mode, or the like may provide context data used to determine individuals are in an environment. In addition, the security application 516 can include setting, and a profile of the user utilized in making determinations related to when to vary input of input devices. For example, when an electronic device in indicated as connected to a home Wi-Fi network, or located in a home environment, the security application may determine not to provide any varying of inputs. To this end, a user may provide, list, etc. locations where no additional security, or varying of inputs should occur. Alternatively, a list of when varying or rearranging should occur can also be provided. Then, based on the profile and the context data, determinations can be made regarding whether to vary inputs, rearrange touch screen keys, or the like when an individual is attempting to access an electronic device via a login, password, etc. Such determinations may be made utilizing a lookup table, decision tree, threshold, calculation, an algorithm, an artificial intelligence algorithm, a machine learning algorithm, a mathematical function, a mathematical model, or the like.

Figure 6:
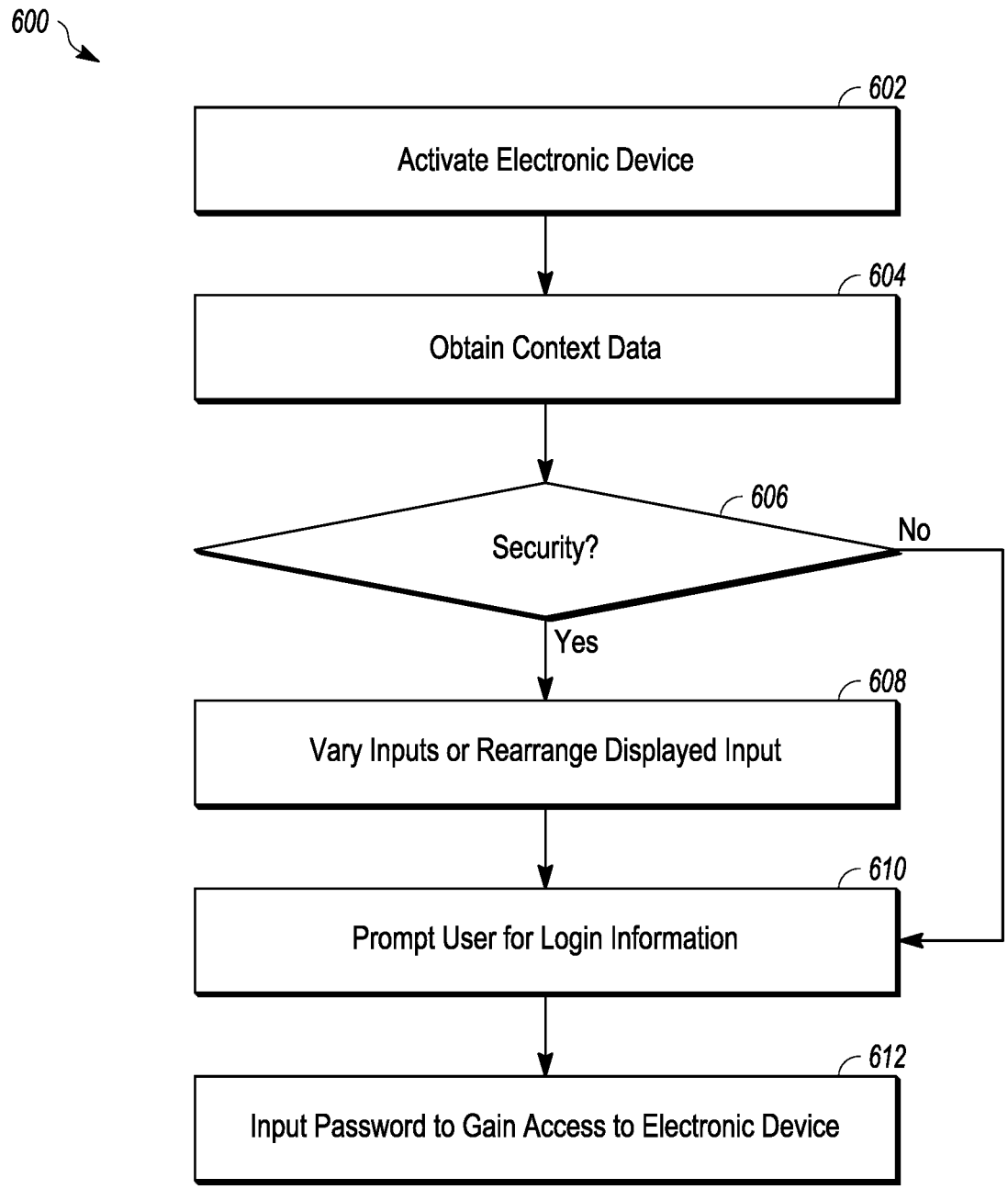
FIG. 6 illustrates a schematic block diagram of a process for accessing an electronic device in accordance with embodiments herein.

FIG. 6 illustrates a process 600 for varying inputs to increase security when accessing an electronic device. In one example, the systems of FIGS. 1-5 are utilized to perform the process.

At 602, one or more processors activate an electronic device, program, application, etc. that includes a login prompt. In one example, the login prompt is provided when an electronic device is powered on, opened, touchscreen is touched, or the like. Alternatively, the login prompt is to a program or application of the electronic device such as a tax assisting application, a budgeting program, a file, or the like. Alternatively, the login prompt is at a webpage, website, or the like. Such websites include banking websites, investment websites, medical websites, credit card websites, or the like. In each instance a login prompt that can include a password is provided on the display.

At 604, one or more processors obtain context data from the electronic device. A security application may be provided that can detect or determine that a login prompt is being displayed on a screen. In one example, the security application can include a profile where a user can input every website, program, application, etc. where additional security may be desired by the user. In another example, the security application is able to identify the login prompt using a mathematical model, algorithm, artificial intelligence algorithm, machine learning algorithm, lookup table, decision tree, or the like. Context data includes any data or information that. Once the determination is made that a login prompt is provided, context data begins to be obtained. Context data includes any audio, image, movement, operating state, or the like that can be used by the one or more processors to determine if individuals other than the user are in an environment. In one example, the electronic device can include one or more sensors such as cameras, microphones, etc. used to detect the context data. In other example, the context data may be received from another electronic device in the environment and communicated to the electronic device. In yet another example, the context data may include operation in airplane mode, being connected or accessing a publically available network, information and data input by a user, information within a storage device or memory of the electronic device, or the like.

At 606, the one or more processors determine whether additional security is required as a result of another individual determined to be within an environment based on the context data. In one example, the one or more processors may utilize an algorithm, lookup table, decision tree, mathematical algorithm, mathematical model, mathematical function, artificial intelligence algorithm, machine learning algorithm, or the like to make such a determine based on the context data obtained.

If at 606, at least one other individual is determined to be within the environment and additional security is required, at 608, the one or more processors vary inputs of keys, vary locations of keys on a display, rearrange the order of keys compared to a traditional keyboard, or the like to provide additional security when entering a password or other information to gain access to an electronic device, program, application, webpage, website, etc. In one example, when a physical keyboard is provided as an input device, the input device input (e.g. keyboard input) is varied from a key that is actuated. So, if a user presses or actuates the key that includes a key indicator "o", a different input or value is provided to the electronic device, such as "u" "5", "m" etc. In such an example, a touchscreen keyboard may be provided on the display that includes keys with key indicators that indicate what the input will be when the "o" key is actuated. Such a key indicator may have "ou" where the first letter "o" is the key indicator of the key on the keyboard, and the second letter "u" is the letter actually inputted into a login prompt of the electronic device.

In another example, the electronic device may include a touchscreen keyboard, where based on the context data, locations of individuals in an environment are identified. Once identified, the one or more processors, including through use of a security application may determine the location on the display to place the touchscreen keyboard. To this end, the touchscreen keyboard can be located on the display such that a user can block individual from seeing the touchscreen keyboard. In yet another example, the size of the touchscreen keyboard can be reduced, again to make determining the keys being actuated by an individual in the environment more difficult. In yet another example, the keys of the touchscreen keyboard are rearranged so that the keys do not appear like a traditional keyboard. As an example, the top row of keys may include "8, 4, 6, 1, 3, 9, 0, 2, 7" in that order instead of "1, 2, 3, 4, 5, 6, 7, 8, 9, 0" of a traditional keyboard, while the second row of keys include "p, c, e, w, j, q, z, t, s, l" instead of "q, w, e, r, t, y, u, i, o, p" of a traditional keyboard. By rearranging the keys compared to a traditional keyboard, determining values being inputted by a user becomes more difficult, increasing security.

If at 606 additional security is not required, or if at 608 additional security is provided as a result of varying inputs, rearranging keys, etc., at 610 the one or more processors prompt a user for login information in a login prompt. The login prompt can include a space for a user name, password, or the like for accessing the electronic device. Optionally, the login prompt can be for accessing a program, application, webpage, website, or the like.

At 612, the one or more processors grant access to the electronic device, program, application, webpage, website, etc. based on the input device input provided in to the login prompt. By checking the context data to determine the need for security when a login prompt is set to be launched, the input of keys, rearrangement of keys, movement of a touchscreen keyboard, etc. can be implemented to increase security during a login process. Such additional security prevents nefarious individuals in an environment of the electronic device from obtaining password, and other login information to protect the user.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a data storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
a processor;
a data storage device having executable instructions accessible by the processor;
wherein, responsive to execution of the instructions, the processor configured to:
obtain context data;
provide a login prompt on a display;
vary the location of a touchscreen keyboard on the display based on the context data; and
vary the location of the touchscreen keyboard by determining a location of at least one individual other than a user of the electronic device in an environment of the electronic device, and locating the touch screen keyboard in a position on the display so that the user is between the touchscreen keyboard and the at least one individual.

2. The electronic device of claim 1, wherein the touchscreen keyboard has plural keys, wherein each key of the plural keys provides a value entered into the login prompt.

3. The electronic device of claim 2, wherein the value is at least one of a letter, number, or symbol.

4. The electronic device of claim 3, wherein the processor is configured to display the touchscreen keyboard on a display screen of the display that includes at least one key that has a key indicator along with the value placed in the login prompt when the at least one key of a keyboard is actuated.

5. The electronic device of claim 1,
wherein the processor is configured to:
determine whether an individual other than a user is within an environment of the electronic device; and
vary a value input into the login prompt from the touchscreen keyboard in response to determining the individual other than the user is within the environment.

6. The electronic device of claim 1, the processor is configured to:
determine whether an individual other than a user is within an environment of the electronic device;
display the touchscreen keyboard with a key arrangement of a traditional keyboard in response to determining the individual other than the user is not in the environment; and
display the touchscreen keyboard with the key arrangement different than the traditional keyboard in response to determining the individual other than the user is in the environment.

7. The electronic device of claim 1, further comprising a sensor configured to obtain the context data.

8. The electronic device of claim 1, wherein the context data includes user characteristics and environmental characteristics.

9. The electronic device of claim 1, wherein the context data is obtained from calendar information in the data storage device.

10. A method, comprising:
under control of one or more processors including program instructions to:
obtain context data;
provide a login prompt; and
vary the location of a touchscreen keyboard on a display of an electronic device based on the context data;
wherein to vary the location of the touchscreen keyboard includes determining a location of at least one individual other than a user of the electronic device; and
locating the touch screen keyboard in a position on the display so that the user is between the touchscreen keyboard and the at least one individual.

11. The method of claim 10, wherein the touchscreen keyboard has plural keys, and at least one key of the plural keys has a key indicator, and when actuated, the at least one key provides a value into the login prompt that is different than the key indicator.

12. The method of claim 11, further comprising to display the touchscreen keyboard on the display that includes at least one key that has the key indicator along with the value placed in the login prompt when the at least one key of the keyboard is actuated.

13. The method of claim 12, further comprising to:
determine whether an individual other than a user is within an environment of the electronic device; and
vary a value input into the login prompt from actuating the at least one key to be different than the key indicator on the at least one key in response to determining the individual other than the user is within the environment.

14. The method of claim 10, further comprising to:
   determine whether an individual other than a user is within an environment of the electronic device;
   display the touchscreen keyboard with a key arrangement of a traditional keyboard in response to determining the individual other than the user is not in the environment; and
   display the touchscreen keyboard with the key arrangement different than the traditional keyboard in response to determining the individual other than the user is in the environment.

15. The electronic device of claim 7, wherein the sensor is at least one of a camera or a microphone and is configured to obtain the context data from a physical region in which the electronic device is located.

16. The method of claim 10, wherein to obtain the context data includes obtaining the context data from a camera or microphone of the electronic device that detects a physical region in which the electronic device is located.

17. A computer program product comprising a non-signal computer readable storage medium comprising computer executable code to automatically;
   obtain context data;
   provide a login prompt; and
   vary the location of a touchscreen keyboard based on the context data;
   wherein to vary the location of the touchscreen keyboard includes determining a location of at least one individual other than a user of the electronic device: and locating the touch screen keyboard in a position on the display so that the user is between the touchscreen keyboard and the at least one individual.

18. The computer product of claim 17, to further automatically:
   determine whether an individual other than a user is within an environment of the electronic device;
   display the touchscreen keyboard with a key arrangement of a traditional keyboard in response to determining the individual other than the user is not in the environment; and
   display the touchscreen keyboard with the key arrangement different than the traditional keyboard in response to determining the individual other than the user is in the environment.

\* \* \* \* \*